United States Patent
Guerriero et al.

[11] 3,913,941
[45] Oct. 21, 1975

[54] INDEPENDENT REAR SUSPENSION FOR MOTOR VEHICLES

[75] Inventors: Charles P. Guerriero, Dearborn Heights; Donald K. Hayward, Dearborn, both of Mich.

[73] Assignee: Ford Motor Company, Dearborn, Mich.

[22] Filed: July 8, 1974

[21] Appl. No.: 486,732

[52] U.S. Cl. .............................. 280/124 A; 267/40
[51] Int. Cl.² ........................................ B60G 11/46
[58] Field of Search....... 280/124 R, 124 A; 267/40, 267/41

[56] References Cited
UNITED STATES PATENTS

| | | | |
|---|---|---|---|
| 1,361,047 | 12/1920 | Gregory | 280/124 |
| 1,711,881 | 5/1929 | Fornaca | 280/124 |
| 2,460,106 | 1/1949 | Rowland | 280/124 X |
| 2,992,835 | 7/1961 | Vittone | 280/124 |

*Primary Examiner*—Philip Goodman
*Attorney, Agent, or Firm*—Clifford L. Sadler; Keith L. Zerschling

[57] ABSTRACT

According to the present disclosure an independent rear suspension system for a motor vehicle includes left and right wheel support members that rotatably support nonsteerable, nondriving wheels. Left and right laterally extending suspension arms are pivotally connected to the vehicle frame and the wheel support members. A transverse leaf spring is supported on the vehicle frame adjacent to the inner pivots of the arms. The outer ends of the leaf spring engage the wheel support members. Vertically extending shock absorbers have their lower ends rigidly connected to the wheel support members and their upper ends connected to vehicle body structure. This suspension is particularly appropriate to a light weight vehicle having front wheel drive. The laterally extending suspension arms and vertical shock absorbers constitute the sole reaction members carrying brake torque, in addition to determining the jounce and rebound path of the wheels.

6 Claims, 4 Drawing Figures

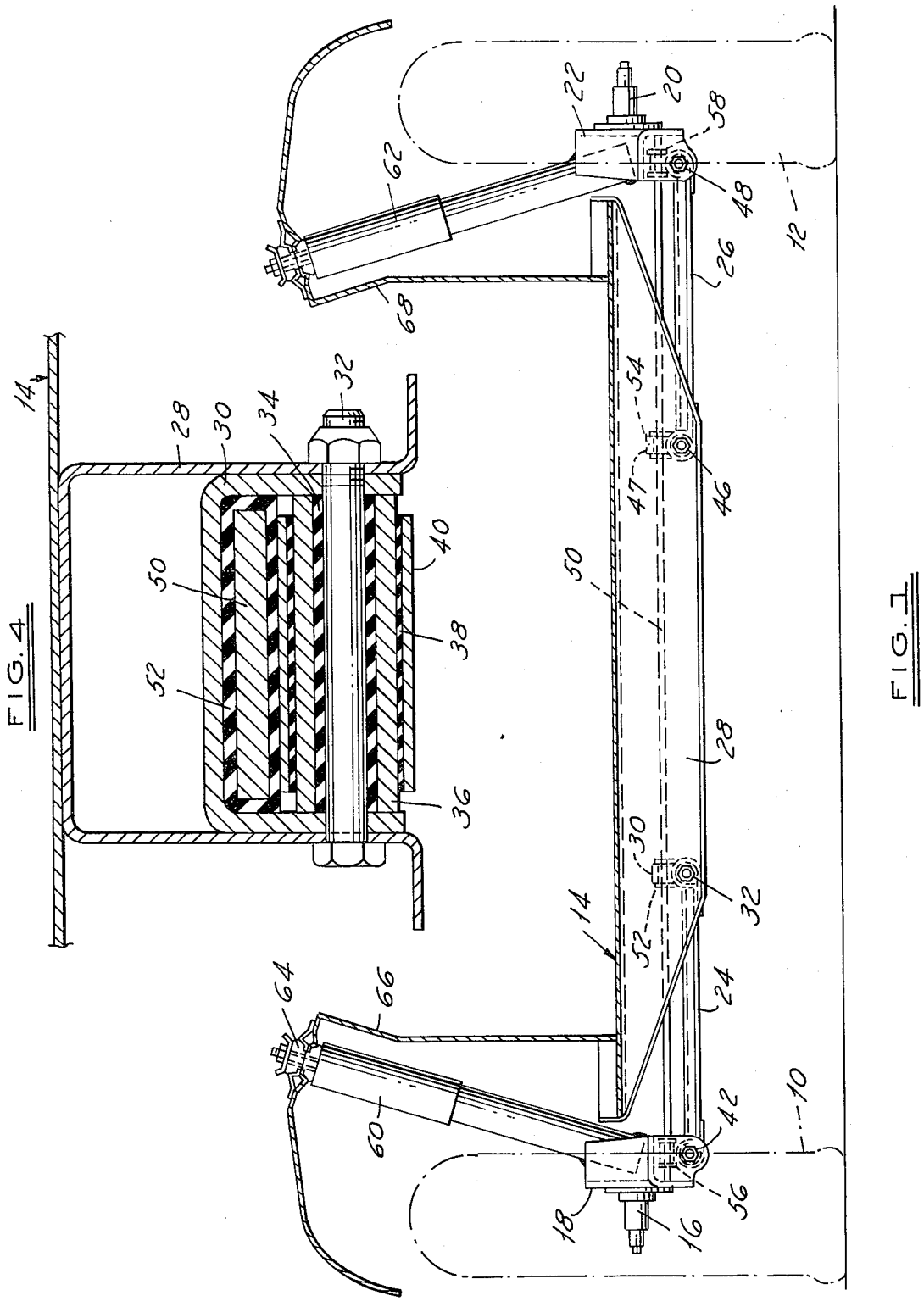

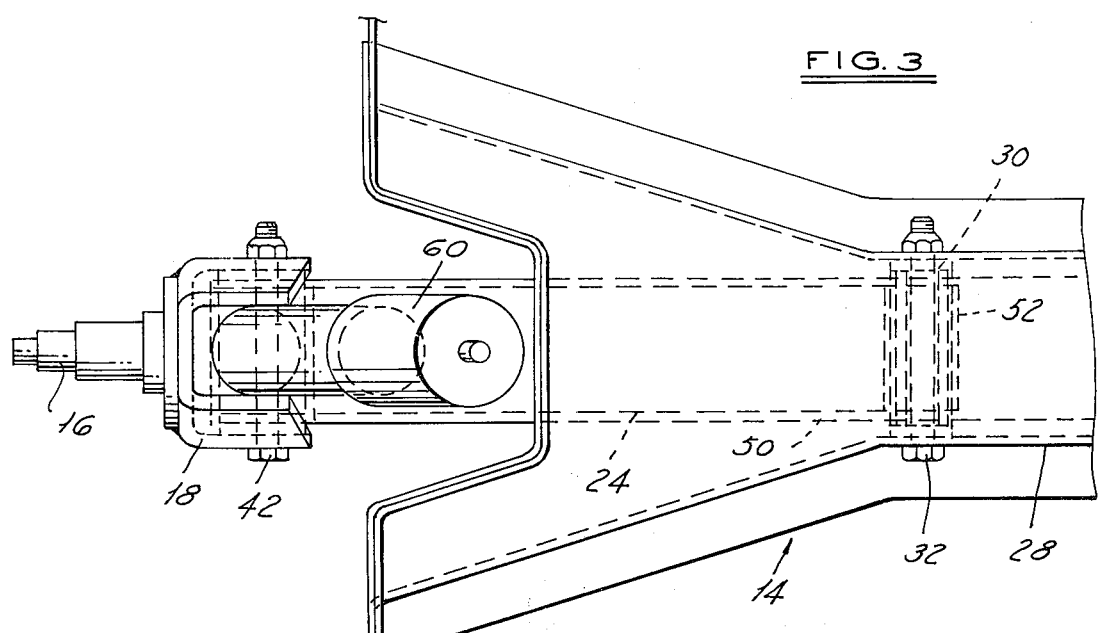
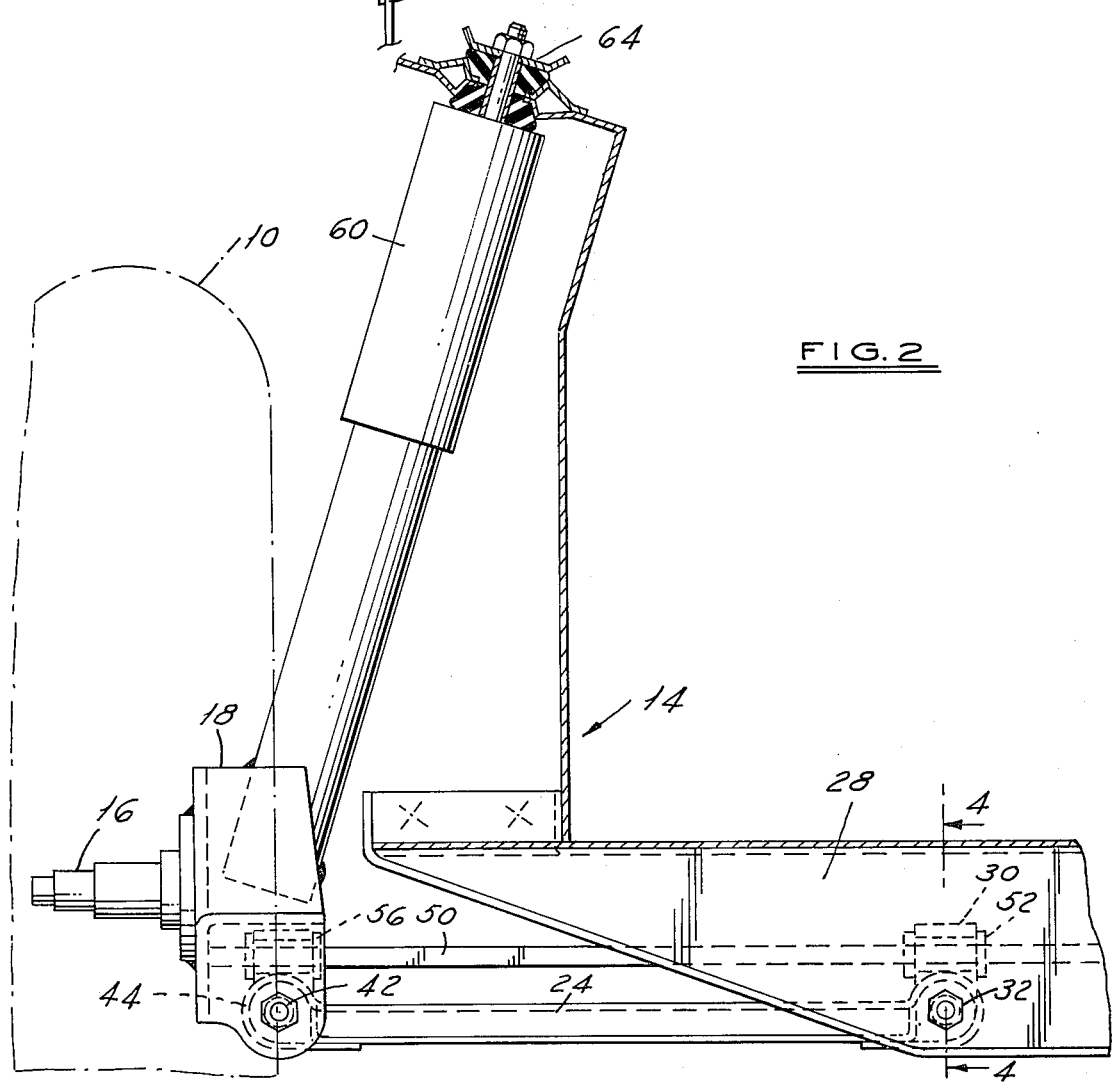

INDEPENDENT REAR SUSPENSION FOR MOTOR VEHICLES

BACKGROUND AND SUMMARY OF THE DISCLOSURE

It is an object of the present invention to provide an independent rear suspension principally for a light weight or compact passenger car having front wheel drive. The suspension is characterized by its simplicity of construction and economy of manufacture.

In the illustrated embodiment of this invention, an independent rear suspension has left and right nondriving, nonsteerable road wheels that are rotatably supported by left and right wheel support members. Left and right laterally extending suspension arms interconnect a vehicle frame member and the wheel support members. The left and right laterally extending suspension arms pivot about fixed pivot axes at their connection with the vehicle frame and about pivot axes that are fixed with respect to the left and right wheel support members.

A transverse single leaf spring is supported on the vehicle frame by a pair of clamp devices adjacent to the inner pivots of the lateral arms. The outer portions of the leaf spring are disposed in generally parallel relationship to the lateral arms and are in engagement with leaf spring supports affixed to the wheel support members. Vertically extending hydraulic shock absorbers have their lower ends rigidly connected to the wheel support members and their upper ends connected to the body structure for limited pivotal movement.

The illustrated suspension permits jounce and rebound movement of the wheels along paths that are dictated by the laterally extending arms and the shock absorbers. Brake torque reaction is transmitted from the wheel support members to the vehicle body through the lateral suspension arms and the shock absorbers. The suspension does not employ longitudinally extending struts or arms for torque reaction purposes.

BRIEF DESCRIPTION OF THE DRAWINGS

The many objects and advantages of an independent rear suspension system for a motor vehicle that is constructed in accordance with this invention will become apparent upon consideration of the following detailed description and the accompanying drawings, in which:

FIG. 1 is a rear elevational view, partly in section, of an improved rear suspension system for a motor vehicle;

FIG. 2 is an enlarged rear elevational view of a portion of the suspension of FIG. 1;

FIG. 3 is a top plan view of the structure shown in FIG. 2; and

FIG. 4 is a sectional view taken along section line 4—4 of FIG. 2.

DETAILED DESCRIPTION OF A PREFERRED EMBODIMENT

Referring now to the drawings wherein the presently preferred form of this invention is illustrated, FIG. 1 discloses left and right road wheels 10 and 12 that are coupled to a vehicle body 14 by a unique suspension system.

The left wheel 10 is rotatably supported on the stub axle portion 16 of a wheel support member 18. Similarly, the right wheel 12 rotates on a stub axle 20 which forms a part of the right wheel support member 22. The wheels 10 and 12 are nonsteerable, nondriving road wheels and the stub axles 16 and 20 provide axes of rotation that are fixed with respect to the left and right wheel support members 18 and 22. The brakes associated with the wheels 10 and 12 are also supported by the wheel support members 18 and 22.

Left and right laterally extending suspension arms 24 and 26 interconnect the left and right wheel support members 18 and 20 with the vehicle body 14. The vehicle body 14 includes a channel shape transverse frame member 28. The inner end of the left suspension arm 24 is connected to the frame member 28 by the structure shown in FIG. 4.

A U-shape member 30 is positioned within the frame member 28. The side walls of member 30 engage the fore and aft vertical walls of the frame member 28. A pivot bolt 32 extends between the walls of the two members 28, 30 and is surrounded by a rubber cylinder 34 which, in turn, is surrounded by a metal cylinder 36. A thin rubber cylinder 38 encases the metal cylinder 36. The rubber cylinder 34, metal cylinder 36 and rubber layer 38 constitute a resilient bushing assembly. The inner end of the left lateral suspension arm 24 is provided with an eye 40 and the resilient bushing assembly is disposed within that eye.

The outer end of the left arm 24 is connected to the left wheel support member 18 by a similar pivot structure. It includes a pivot bolt 42 that extends through a resilient bushing assembly that comprises concentric rubber, metal and rubber cylinders. The resilient bushing assembly, in turn, is fitted within an eye 44 formed on the outer end of the suspension arm 24.

The right suspension arm 26 is connected to the frame member 28 and the wheel support member 22 by pivot constructions similar to that illustrated in FIG. 4. The inner pivot for the right arm 26 includes a resilient bushing assembly fitted within an eye formed at the inner end of the arm. The bushing and eye are situated within a U-shape member 47 (which corresponds to the member 30 of FIG. 4) and the assembly is connected to the channel shape frame member 28 by pivot bolt 46. Similarly, a resilient bushing is disposed in an eye at the outer end of the right arm 26 and a pivot bolt 48 extends through that bushing and pivotally connects the end of the arm to the wheel support member 22.

Means are provided for resiliently supporting the vehicle body 14 on the wheels 10 and 12. A transversely extending single leaf spring 50 is secured to the frame member 28 adjacent the pivot bolts 32 and 46. Referring to FIG. 4, the spring 50 extends between the side walls of the U-shape member 30 and is surrounded by a rubber piece 52. The rubber 52 is compressed so that it frictionally grips the spring 50. In a similar manner, a rubber element 54 surrounds the spring 50 adjacent the pivot bolt 46. It is secured within the U-shape member 47.

The outer ends of the leaf spring 50 are supported adjacent the outer pivot bolts 42 and 48 by structures which are similar to that illustrated in FIG. 4. The left and right ends of the spring 50 extend through annular rubber elements 56 and 58 that are clamped to the left and right wheel support members 18 and 22.

The portions of the leaf spring 50 outwardly of the pivot bolts 32 and 46 are arranged generally parallel to and adjacent the suspension arms 24 and 26. As the arms 24 and 26 move in jounce and rebound, the spring flexes along its length.

Means are provided to dampen jounce and rebound movement of the suspension system. Left and right telescopic hydraulic shock absorbers 60 and 62 are interposed between the wheel support members 18 and 22 and vehicle body structure. The left shock absorber 20 has its lower end welded or otherwise rigidly secured to the left wheel support member 18. The upper end of the shock absorber 60 is pivotally connected by means of a resilient bayonet type mount 64 to a sheet metal body panel 66 of the vehicle body 14. Similarly, the right shock absorber 62 is rigidly secured to the right wheel support member 22 and pivotally connected at its upper end to vehicle body panel 68.

OPERATION

The independent suspension illustrated in the drawings is intended for a light weight front wheel drive vehicle. The wheels 10 and 12 are not driving wheels and are not steerable.

The left and right wheels 10 and 12 transverse jounce and rebound paths with respect to the vehicle body 14 by pivotal movement of the suspension arms 24 and 25 about the pivot axes provided by the inner pivot bolts 32, 46 and the outer pivot bolts 42, 48. Jounce and rebound movement of the wheels 10 and 12 is also accompanied by telescopic contraction and extension of the hydraulic shock absorbers 62 and 62. The path of the movement of the wheels 10 and 12 with respect to the body 14 is determined soley by the suspension arms 24 and 26 and the shock absorbers 60 and 62.

In its unrestrained state the leaf spring 50 has a generally bowed shape with downwardly sloping ends. When installed in a vehicle as illustrated in FIG. 1, the stressing of the spring 50 resiliently supports the vehicle body 14 on the wheels 10 and 12. The spring 50 flex along its length as the suspension arms 24 and 26 move in jounce and rebound.

When the wheels 10 and 12 move vertically with respect to the body 14, the inner rubber elements 50, 52 and the outer rubber elements 56, 58 which surround the spring 50 will flex due to the misalignment as the wheel support members 18 and 22 follow a path dictated by the suspension arms 24, 26 and the shock absorbers 60, 62. In the event that the jounce or rebound movement is extreme, some sliding may occur between the ends of the leaf spring 50 and the outer rubber elements 56 and 58.

Brake torque associated with the braking of the wheels 10 and 12 is carried by the suspension arms 24, 26 and the shock absorbers 60, 62. These elements constitute the sole brake torque reaction members. The construction of the connection of the suspension arms 24, 26 and the shock absorbers 60, 62 with the vehicle body 14 and the wheel support members 18, 22 permits these suspension components to carry all of the brake torque. Longitudinally extending struts or suspension arms are not employed.

In summary an independent rear suspension for a motor vehicle according to the present invention is characterized by its simplicity and light weight construction. It is particularly well suited for a compact passenger car where reduced weight and economy is important.

The foregoing description presents the presently preferred embodiment of this invention. Details of construction have been disclosed for purposes of illustration and are not the limits of the invention. Alterations and modifications may occur to those skilled in the art that will come within the scope and spirit of the following claims:

We claim:
1. An independent rear wheel suspension system for a motor vehicle having front wheel drive,
   said suspension system including a vehicle body structure, left and right road wheels and suspension means interconnecting said body structure and said road wheels,
   said suspension means comprising left and right wheel support members,
   said left and right members rotatably supporting said left and right wheels for rotation about transverse axes that are fixed relative to said left and right wheel support members, respectively,
   left and right laterally extending suspension arms,
   left and right inner pivot means connecting said left and right suspension arms to said body structure,
   said left and right inner pivot means having longitudinal pivot axes that are fixed with respect to said body structure,
   left and right outer pivot means connecting said left and right suspension arms to said left and right wheel support members,
   said left and right outer pivot means having longitudinal pivot axes that are fixed relative to said left and right wheel support members, respectively,
   a transverse leaf spring and inner spring support means connecting said spring to said body structure,
   left and right outer spring support means connecting the outer ends of said transverse leaf spring to said left and right wheel support members,
   left and right telescopic hydraulic shock absorbers,
   said left and right shock absorbers having their lower ends rigidly secured to said left and right wheel support members,
   said left and right shock absorbers having their upper ends pivotally connected to said body structure.

2. An independent rear wheel suspension system according to claim 1 and including:
   said left and right outer spring support means comprising resilient means constructed to permit lateral displacement of the ends of said leaf spring relative to said wheel support members when said wheel support members move in jounce and rebound.

3. An independent rear wheel suspension system according to claim 1 and including:
   said inner spring support means being disposed adjacent said inner pivot means,
   said left and right outer spring support means being disposed adjacent said left and right outer pivot means,
   the portion of said leaf spring between said left outer spring support means and said inner spring support means and the portion of said leaf spring between said right outer spring support means and said inner spring support means being disposed closely adjacent and generally parallel to said left and right suspension arms, respectively.

4. An independent rear wheel suspension system according to claim 1 and including:
   said inner spring support means being disposed adjacent said inner pivot means, said left and right outer spring support means being disposed adjacent said left and right outer pivot means, the portion of said leaf spring between said left outer spring support means and said inner spring support means and the portion of said leaf spring between said right outer spring support means and said inner spring support means being disposed closely adjacent and generally parallel to said left and right suspension arms, respectively, said left and right outer spring support means comprising resilient means constructed to permit lateral displacement of the ends of said leaf spring relative to said wheel support members when said wheel support members move in jounce and rebound.

5. An independent rear wheel suspension system according to claim 1 and including:

said left and right outer spring support means being constructed to permit lateral displacement of the ends of said leaf spring relative to said wheel support members when said wheel support members move in jounce and rebound, said leaf spring comprising a single spring leaf, said inner and outer spring support means comprising annular resilient elements disposed about said leaf spring and secured to said body structure and said wheel support members, respectively.

6. An independent rear wheel suspension system for a motor vehicle having front wheel drive, said suspension system including a vehicle body structure, left and right road wheels and suspension means interconnecting said body structure and said road wheels, said suspension means comprising left and right wheel support members, said left and right wheel support members rotatably supporting said left and right wheels for rotation about axes that are fixed relative to said left and right wheel support members, respectively, said body structure including a transverse channel shape frame member having fore and aft spaced vertical walls, left and right laterally extending suspension arm disposed, in part, between said vertical walls, said suspension arms having pivot eyes formed at their inner ends, left and right inner pivot means disposed within said eyes of said left and right suspension arms and secured to said fore and aft vertical walls, said inner pivot means having longitudinal pivot axes that are fixed with respect to said body structure, left and right outer pivot means connecting said left and right suspension arms to said left and right wheel support members, said left and right outer pivot means having longitudinal pivot axes that are fixed with respect to said left and right wheel support members, respectively, a transverse single leaf spring disposed, in part, between said vertical walls, left and right inner resilient spring support means connecting said leaf spring to said vertical walls adjacent to said eyes of left and right suspension arms, left and right outer spring support means connected to said left and right wheel support members adjacent said left and right outer pivot means, said left and right outer spring support means supporting the outer ends of said transverse leaf spring for lateral displacement relative to said left and right wheel support members when said wheel support members move in jounce and rebound, the portions of said leaf spring outwardly of said left and right inner spring support means being disposed closely adjacent and generally parallel to said left and right suspension arms, respectively, the portion of said leaf spring between said left and right inner spring support means being situated between said vertical walls of said channel shape frame member, left and right telescopic hydraulic shock absorbers, said left and right shock absorbers having their lower ends rigidly secured to said left and right wheel support members, said left and right shock absorbers having their upper ends pivotally connected to said frame.

* * * * *